UNITED STATES PATENT OFFICE.

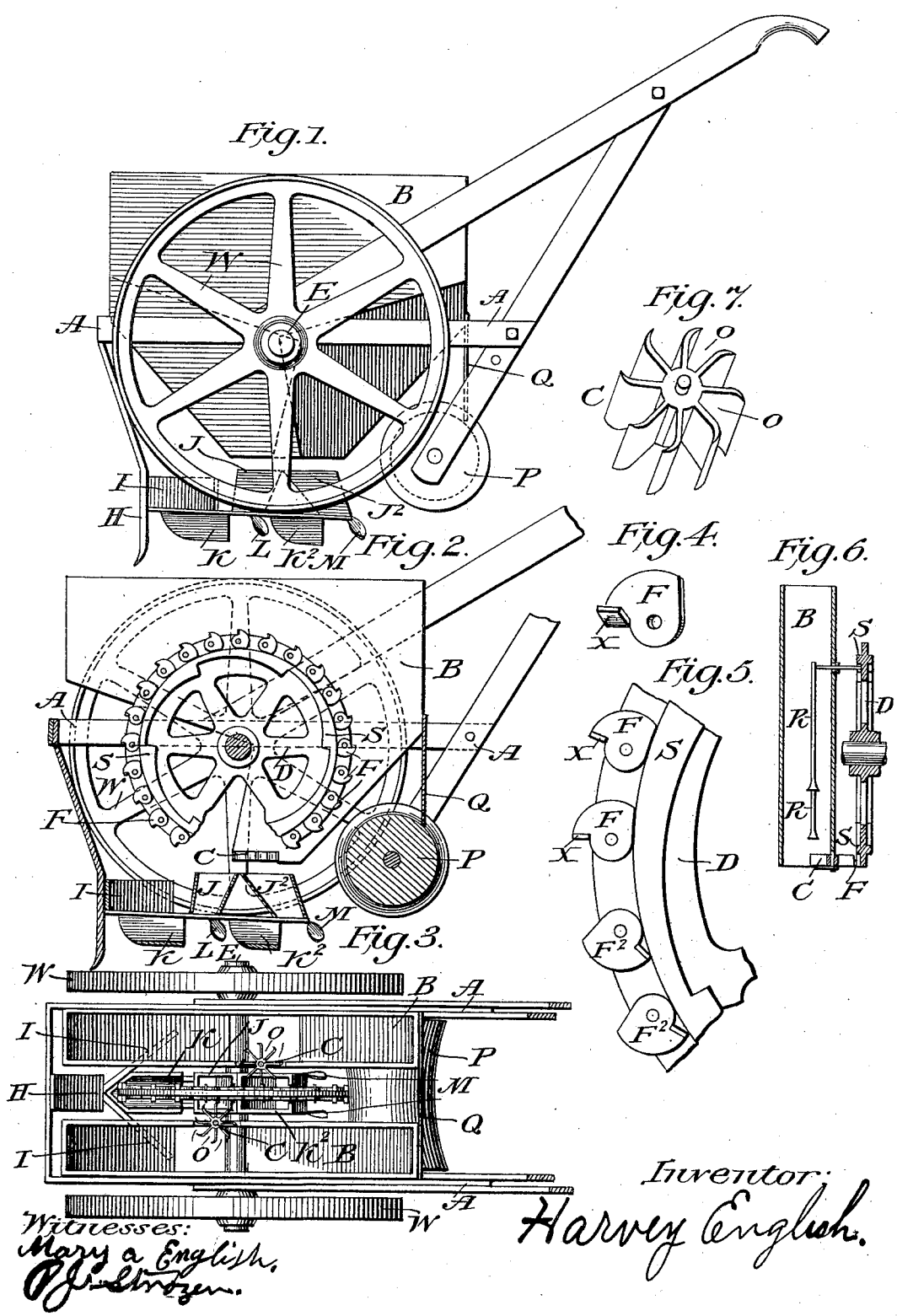

HARVEY ENGLISH, OF ALBANY, GEORGIA.

SEED-PLANTING AND FERTILIZER-DISTRIBUTING MACHINE.

SPECIFICATION forming part of Letters Patent No. 688,075, dated December 3, 1901.

Application filed May 23, 1901. Serial No. 61,576. (No model.)

*To all whom it may concern:*

Be it known that I, HARVEY ENGLISH, a citizen of the United States, residing at Albany, in the county of Dougherty and State of Georgia, have invented a new and useful Seed-Planting and Fertilizer-Distributing Machine, of which the following is a specification, reference being had to the accompanying drawings and to the letters of reference marked thereon.

Similar letters of reference refer to similar parts throughout the specification and claims.

The object of my invention is to provide a machine which will more quickly, cheaply, efficiently, and accurately plant seed and distribute fertilizer than anything heretofore in use. To accomplish this, I employ certain novel arrangements and combinations of parts hereinafter first fully described and then pointed out in the claims.

In the drawings, Figure 1 is a side elevation of the machine. Fig. 2 is a vertical longitudinal section of the same. Fig. 3 is a top or plan view. Fig. 4 is a perspective view of one of the reversible cogs. Fig. 5 is an enlarged detail view of a part of wheel D with reversible cogs attached. Fig. 6 is a sectional detail of the shaker or agitator. Fig. 7 is a perspective view of one of the distributing-wheels.

A is the framework of the machine, to which the several parts are attached and braced.

B B are two hoppers to carry seed and fertilizer, from which they are distributed by two distributing-wheels C C. These wheels C C are placed or journaled at the bottom of hoppers B B and on the sides next to center of machine, with one-half of their diameter projecting outwardly from hoppers B B toward center of machine. The frequency of dropping of seed and fertilizer is governed by wheel D.

D is a wheel constructed, preferably, of solid wrought-iron or steel plate, with cast-iron hub firmly attached to shaft E and of a diameter sufficient to reach to or near the bottom of hoppers B B. On each side of wheel D and near its circumference are attached twenty-four, (24,) more or less, reversible teeth or cogs F, so arranged that when the wide end X of cogs is turned to circumference of the wheel it will engage with distributing-wheel C C and cause it to make a partial revolution and bring with it the seed or fertilizer contained in the spaces O of distributing-wheel C.

W W are two operating-wheels firmly attached to the ends of shaft or axle E. Wheels W W and wheel D are firmly attached to and revolve with shaft E. The wheels W W may be of any desired circumference. For purpose of illustration I will assume them to be seventy-two (72) inches in circumference. It is obvious if all the cogs F are turned to circumference of wheel D, as shown at X, Fig. 5, that seed or fertilizer will be distributed at intervals of three (3) inches apart in the drill. If every second one is turned to circumference, it will distribute six (6) inches apart. If every third one is turned to circumference of wheel, it will distribute nine (9) inches apart. If every fourth one is turned to circumference of wheel, it will distribute twelve (12) inches apart. If every sixth one is turned to circumference of wheel, it will distribute eighteen (18) inches apart. If every eighth one is turned to circumference of wheel, it will distribute twenty-four (24) inches apart. If every twelfth one is turned to circumference of wheel, it will distribute thirty-six (36) inches apart. If only one cog F is turned to circumference of wheel, it will distribute seventy-two (72) inches apart. If none of the cogs are turned to circumference of wheel, as shown at $F^2$, Fig. 5, there will be no distribution.

H is the drill or opener secured to the two wings I I, forming nearly a right angle with each other and serving to scrape the clods or trash from off the seed-bed, throwing this trash outside the limits of the track of the machine.

K is a V-shaped projection located in the direction of the axis of the machine below the wings I I and in the rear of opener H, serving to press the furrow open to receive the fertilizer and terminating just in front of spout J, which receives the fertilizer from distributing-wheel C.

L L are two small wings curved and bent, as shown in the drawings. These follow after the projection K and serve to turn the earth over the fertilizer.

$K^2$ is a projection similar to projection K, which follows immediately after wings L L and serves to press the furrow open for the reception of seed, terminating just in front of spout J², which receives the seed from distributing-wheel C.

M M are two wings similar to L L, following after K² and serving to return the earth over the seed.

All of the earth opening and covering devices are firmly secured together and by band and braces to the frame of machine, whereby they are all carried by the front part of machine.

P is a roller following after the coverers. It is larger at the ends than in the middle, as shown, for the purpose of forming the earth upon the row of seeds into a ridge.

Q is a scraper to clean roller P of adhering earth.

R R are two shakers or agitators in hoppers B B and are operated by eccentrics S S on wheel D, which slowly raise and quickly drop the shakers, thereby causing the seed and fertilizer to be shaken to the bottom of hopper and preventing clogging.

In this description I make use of operating-wheels of seventy-two (72) inches circumference and of governing-wheel with twenty-four (24) reversible cogs on each side. This is for purpose of illustration only. Operating-wheels may be larger or smaller than seventy-two (72) inches, and governing-wheel D may have more or fewer reversible cogs than twenty-four (24) on a side.

I am aware that prior to my invention planting-machines have been made with earth opening and covering devices of a like character to the one used by me. I therefore do not claim originality of invention in their use except in combination with the wheels W W, hoppers B B, distributing-wheels C C, shakers R R, operated by eccentrics S S on wheel D, governing-wheel D, with reversible cogs F, revolving with shaft E, scraper Q, and roller P, substantially as shown.

Having thus fully described my invention, what I claim as new, and desire to secure by Letters Patent, is—

1. In a planting and distributing machine the combination of an earth opening, covering, reopening, and re-covering part, separate hoppers B, B, for seed and fertilizer, distributing-wheels C C, governing-wheel D, with reversible cogs F, operating on wheels C, C, shakers R, R, operated by eccentrics S, S, on wheel D, roller P, scraper Q, and frame A, substantially as described.

2. In a planting and distributing machine the combination of wheel D, with reversible cogs F operating on distributing-wheels C, C, substantially as described.

3. In a planting and distributing machine the combination of reversible cogs F, on each side of and near to circumference of governing-wheel D, said cogs F, operating on distributing-wheels C, C, substantially as described.

4. In a planting and distributing machine the combination of hoppers provided with distributing-wheels C, C, operated by reversible cogs F, attached to wheel D, substantially as described.

5. In a planting and distributing machine the combination of hoppers B, B, with distributing-wheels C, C, operated by reversible cogs F, attached to wheel D, revolving with shaft E shakers R, R, operated by eccentrics S, S on wheel D with frame A, operating-wheels W, W, and opening, covering, reopening, re-covering devices, scraper Q and roller P, substantially as shown.

HARVEY ENGLISH.

Witnesses:
  G. L. BLALOCK,
  J. B. MURROW.